Patented Nov. 25, 1947

2,431,374

UNITED STATES PATENT OFFICE 2,431,374

COPOLYMERS OF DIALLYL MALEATE AND SATURATED MONOHYDRIC ALCOHOL ESTERS OF MALEIC AND FUMARIC ACIDS

Gaetano F. D'Alelio, Northampton, Mass., assignor to Pro-phy-lac-tic Brush Company, Northampton, Mass., a corporation of Delaware No Drawing. Application December 30, 1943, Serial No. 516,274

3 Claims. (Cl. 260—78.5)

This invention relates to the preparation of synthetic resin compositions and more particularly to the preparation of heat-convertible, soluble, fusible copolymers of diallyl maleate with other polymerizable compounds.

It is known that the polymerization of compounds possessing more than one terminal $CH_2=C<$ grouping, providing the system is not conjugated and under the normal conditions of polymerization, results in the formation of a cross-linked insoluble, infusible polymer. It is likewise known that organic compounds containing a plurality of $CH_2=C<$ groups, such as the dienes, and specifically the butadienes, will also act as cross-linking agents when the polymerization is uncontrolled. Examples of such compounds resulting in insoluble, infusible polymers are glycol dimethacrylate, divinyl ether, vinyl allyl ether, allyl acrylate, diallyl phthalate, diallyl ether, dimethallyl ether, etc. Diallyl maleate behaves in the same fashion. However, the course of the polymerization is much more involved since polymerizability resides not only in the two allyl groups of the ester radical, but also in the ethylenic double bond of the maleic acid residue. The formula of diallyl maleate is

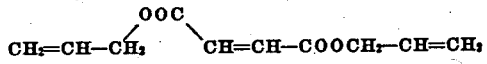

Extensive experiments carried out on the polymerization of diallyl maleate indicate that an insoluble resin is obtained as a gel when ordinary polymerization methods are employed. This gel formation, as noted in the cited examples, takes place in a short time, e. g., in about thirteen (13) minutes. The extreme sensitivity of this reaction precludes its use in many industrial applications. Attempts have been made to utilize diallyl maleate in the form of its partial polymer. The low gelation time has made the control of this polymerization difficult.

I have now discovered that diallyl maleate may be partially copolymerized with a saturated monohydric alcohol ester of an ethylene alpha beta dicarboxylic acid to form a soluble, fusible, heat-convertible copolymer mass, thus making available for wider commercial use a product heretofore inapplicable. Although the copolymeric products of this invention are fusible and soluble, they are still ethylenically unsaturated and still possess polymerizability and heat-convertibility, and may therefore be converted to an insoluble, infusible state. These soluble, fusible copolymers also possess the property that they themselves may be used as the cross-linking agents for other polymerizable monomers and polymers.

The process of this invention, whereby a soluble, fusible polymerizate of diallyl maleate is prepared, comprises polymerizing diallyl maleate in the presence of at least one saturated monohydric alcohol ester of maleic or fumaric acid which not only acts as a moderator of the reaction, but also as a copolymerizing monomer. The mixture of the diallyl maleate and the other moleic ester may be copolymerized for a time less than that required to cause separation or gelation of the copolymer. The dissolved partial copolymer is then precipitated by the addition of a non- or partial solvent or by the evaporation of the volatile constituents.

The sensitivity of diallyl maleate to polymerizing conditions is particularly noted in Example 1 wherein the diallyl maleate solution containing five (5) parts of diallyl maleate and 0.05 part of benzoyl peroxide gelled in thirteen (13) minutes whereas the solutions containing the diethyl maleate had increased gelation times depending on the conditions of polymerization. By means of this invention I may cause the copolymers to form at a much slower rate, thus providing a means of permitting a greater permissible deviation from any calculated time required to give a maximum yield of soluble, fusible copolymer. The time required depends upon the type of the maleic or fumaric ester and the polymerization catalyst present in the solution. I have found that by varying the conditions, a soluble, fusible copolymer may be obtained in a wide limit of reaction times and conditions. Non-reactive media, such as non-solvents or solvents may also be used.

For polymerization catalysts in the preparation of the soluble, fusible copolymers of this invention, I may use the aliphatic acyl peroxides, e. g., acetyl peroxide, lauryl peroxide, stearyl peroxide, etc.; peroxides of the aromatic acid series, e. g., benzoyl peroxide, etc.; ketone peroxides, e. g., acetone peroxide, etc.; ozone, ozonides; inorganic superoxides such as barium peroxide, sodium peroxide, etc.; the persulfates; the perborates; the alkyl derivatives of hydrogen peroxide, e. g., ethyl hydrogen peroxide, diethyl peroxide, etc.; mixed organic peroxides, e. g., acetyl benzoyl peroxides; organic and inorganic acids such as methacrylic acid, hydrofluoric acid and their derivatives such as boron trifluoride, etc.; hydrogen peroxide, etc. However, benzoyl peroxide is the preferred catalyst. Any suitable amount of catalyst may be used, but in general will be within the range of 0.1–3% by the weight of the polymerizable components of the reaction mass.

The actual copolymerization of the composition comprising diallyl maleate and the saturated monohydric alcohol maleic or fumaric ester may be accomplished by any suitable means. However, I prefer to cause the copolymerization under the influence of external heat in the presence of a catalyst for a period substantially less than required to cause gelation of the solution mixture. For purposes of economy and convenience, I prefer to use reflux temperatures and atmospheric conditions although reduced or elevated temperatures and pressures ranging from subatmospheric to superatmospheric may be used. The partial copolymers of diallyl maleate and the other maleic or fumaric esters of this invention may be precipitated by the addition of a non-solvent, e. g., methyl alcohol, ethyl alcohol, ethylene glycol, etc.

As the copolymerizing ingredient which likewise acts as a moderator and controlling ingredient of the reaction I may use at least one compound selected from the ethylene alpha beta dicarboxylic esters, such as the maleic and fumaric diesters of saturated monohydric alcohols of the type having the formula $$ROOCCH=CHCOOR$$

wherein R represents the residue of a monohydroxy alcohol. The only requirement of the alcohol is that it possess one esterifiable hydroxyl group and is devoid of ethylenic and acetylenic unsaturation. As alcohols which may be used in esterifying maleic anhydride, maleic acid, fumaric acid, or their acid chlorides, I may use methyl, ethyl, propyl, isopropyl, butyl, isobutyl, amyl, secondary amyl, isoamyl, mixed amyl, hexyl, cyclopentyl, cyclohexyl, methyl cyclopentyl, methylcyclohexyl, benzyl, phenethyl, chloroethyl, acetoxyethyl, methoxyethyl, ethoxyethyl, butoxyethyl, phenoxyethyl, chlorphenoxyethyl, acetoxypropyl, methoxypropyl, ethoxypropyl, phenoxypropyl, carbalkoxyethyl, etc., alcohols. The terms maleic and fumaric esters as hereinafter used, refer to the monohydric alcohols as mentioned above and do not embrace diallyl maleate within their meaning.

The ester groups in the maleic or fumaric ester may be the same or different. Thus, the ester may be a methyl ethyl, a dimethyl, a diethyl, a methyl propyl, a dipropyl, an ethyl methoxyethyl, etc., ester of maleic and fumaric acid.

The probable structure of these copolymers is

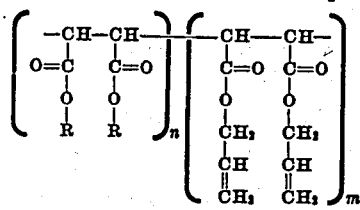

where

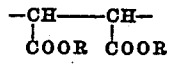

represents the maleic or fumaric ester residue and where

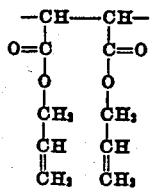

represents the diallyl ester residue and where the numerical value of n and m depends upon the amounts of the corresponding ester used and may vary between one (1) and twenty (20), An even greater advantage accrues from the use of the maleic and fumaric esters in the practice of this invention. The nature of the ester radical produces an internal plasticizing effect in proportion to the type, nature, and length of the chain. Thus, the hexyl ester produces a greater elastic effect on the copolymer than the methyl or ethyl ester.

A wide range of concentrations of diallyl maleate and maleic or fumaric ester may be used in carrying out the practice of my invention depending on the nature of the products desired. Thus, I may use ten (10) mols of diallyl maleate to one mol of maleic ester, for example, dimethyl maleate, diethyl fumarate, methyl ethyl maleate, etc. In other cases, as for example, with ethyl hexyl or decyl maleate, the mol ratio of the diallyl maleate to other maleic esters may be as high as twenty (20) of the former to one mol of the latter.

The copolymers of this invention may be modified to a considerable extent by the presence of other unsaturated and polymerizable materials admixed with the solution at the initiation of the copolymerization of the diallyl maleate and maleic or fumaric ester. Monomers may be added to vary the nature of the resulting copolymer. Illustrative examples of such compounds are the vinyl halides, e. g., vinyl chloride; the vinylidene halides, e. g., vinylidene chloride, vinylidene fluorochloride, etc.; the acrylic acids, e. g., acrylic acid, methacrylic acid, chloroacrylic acid; the esters of acrylic acid, e. g., methyl acrylate, ethyl acrylate, ethyl methacrylate, methyl methacrylate, methyl chloracrylate, fluorophenyl acrylate, etc.; the aryl ethylenes, e. g., styrene, methyl styrene, isopropenyl toluene, toluyl ethylene, bromotoluyl ethylene, etc.; the vinyl esters, e. g., vinyl acetate, vinyl propionate, vinyl butyrate, vinyl benzoate; the nitrile derivatives of acrylic and methacrylic acid, e. g., acrylonitrile, methacrylonitrile, etc.; methylene malonic esters; the mono alkyl esters, e. g., the methyl ester; the diesters, e. g., the dimethyl ester, the dipropyl ester, etc.; the allyl derivatives, e. g., acrolein, methacrolein, allyl methyl ketone, allyl ethyl ketone, allyl chloride, allyl methyl ether, allyl ethyl ether, allyl propyl ether, allyl phenyl ether, allyl acetate, allyl propionate, allyl benzoate, vinyl ethyl ketone, allyl acrylate, methallyl acrylate, diallyl phthalate, diallyl oxalate, diallyl succinate, divinyl ether, diallyl ether, divinyl ketone, diallyl ketone, dimethallyl ketone, etc.

The course of the polymerization likewise may be modified by the presence of inhibitors such as copper, sulfur, naphthyl amine, carbon tetrachloride, etc.

In order that those skilled in the art may better understand the teachings of my invention, the following examples are given:

*Example 1*

The following compositions were heated at 94° C., until gelation occurred.

|   | Diallyl Maleate | Diethyl Maleate | Benzoyl Peroxide | Gelation Time |
|---|---|---|---|---|
|   | *Parts* | *Parts* | *Parts* | *Minutes* |
| A | 5 | 0.0 | 0.05 | 13 |
| B | 5 | 2.5 | 0.05 | 22 |
| C | 5 | 10 | 0.05 | 70 |
| D | 5 | 15 | 0.05 | 176 |

The inhibiting effect of the maleic ester is readily observed from the foregoing table. In this example the polymerizing catalyst used was calculated on the basis that the diallyl maleate was the controlling ingredient. However, the behavior of the diethyl maleate is not to be considered as a diluent retarding effect since in Example 2, wherein the benzoyl peroxide used was calculated on the combined weight of the diallyl maleate and the diethyl maleate, the retarding effect was equally noticeable. A soluble, fusible and heat convertible copolymer can be precipitated by adding a non-solvent in Examples 1B, 1C and 1D after heating for 17 minutes, 50 minutes and 150 minutes respectively.

In order to isolate the soluble, fusible partial copolymer from any of the above compositions, the reflux times in each case are reduced sufficiently to prevent gelation as shown above. The viscous solution of the partial copolymer is poured into methanol or ethanol and the precipitate removed, dried, and ground. The product so obtained is generally soluble in the usual hydrocarbon solvents and is completely fusible. Those copolymers prepared from high concentrations of maleic esters are likewise soluble in acetone. These copolymers contain the maleic ester interpolymerized with the diallyl maleate as is evident from the fact that hydrolysis liberates the alcohol originally present in the maleic ester. When a fumaric ester is used in the above example, similar results are obtained.

*Example 2*

The following compositions were heated at 94° C., until gelation occurred:

| Diallyl Maleate | Diethyl Maleate | Benzoyl Peroxide | Gelation Time |
|---|---|---|---|
| *Parts* | *Parts* | *Parts* | *Minutes* |
| 5 | 2.5 | 0.075 | 13 |
| 5 | 5 | 0.10 | 16 |
| 5 | 10 | 0.15 | 26 |
| 5 | 15 | 0.20 | 66 |

In this example the peroxide catalyst was calculated on the total weight of the component and the effect of the diethyl maleate is readily observed.

*Example 3*

I may also control the rate of the copolymerization of the diallyl maleate and the maleic or fumaric ester by the addition of an inert non-solvent or solvent such as toluene, benzene, ethylene dichloride, ethyl acetate, etc..

*Parts by weight*
Diallyl maleate _____ 5
Diethyl maleate _____ 2.5
Benzoyl peroxide _____ 0.05
Toluene (inert hydrocarbon) _____ 10

The solution was heated at 94° C., for a period of seventy (70) minutes without gelation. The copolymer may be isolated by precipitation with non-solvents.

*Example 4*

The following table illustrates the modification of the fundamental copolymers of this invention by other polymerizable materials, examples of which have been given heretofore. The particular monomer used is styrene as representative of the class of compounds containing at least one CH₂=C< grouping. The following mixtures comprising the diallyl maleate and the maleic ester were heated for about eight (8) hours at 88° C., without gelation.

| | Diallyl Maleate | Diethyl Maleate | Styrene | Toluol | Benzoyl Peroxide |
|---|---|---|---|---|---|
| | *Parts* | *Parts* | *Parts* | *Parts* | *Parts* |
| A | 4.9 | 4.3 | 5.2 | 7.5 | 0.049 |
| B | 4.9 | 4.3 | 5.2 | 7.5 | 0.144 |
| C | 7.4 | 2.2 | 5.2 | 7.5 | 0.049 |
| D | 7.4 | 2.2 | 5.2 | 7.5 | 0.144 |

As prepared, these solutions may be used directly as coating or impregnating compositions, or, the soluble, fusible copolymers may be isolated by precipitation with non-solvents, such as absolute ethyl alcohol. The isolated soluble, fusible polymers of this example were soluble in styrene, diallyl maleate, acetone, benzene, etc.

When a high concentration of added monomer was used, the solutions were cast to insoluble, infusible masses at 80° C. with the addition of added benzoyl peroxides. These solutions were likewise satisfactory as impregnants for electric coils as well as for sheet stock, such as cellulose, glass fibers, etc. Pastes are prepared when small amounts of monomer are added and such compositions, with and without fillers, may be used as molding powders at lower pressures than normally used in industrial moldings either in compression or jet type moldings. All of the compositions comprising the soluble, fusible copolymerizates of diallyl maleate and a maleic or fumaric ester cure very rapidly at elevated temperatures of about 120° to 150° C.

*Example 5*

The soluble, fusible copolymers of Examples 1 and 2 may be modified by copolymerizing the diallyl maleate and an ester of maleic or fumaric acid in the presence of other monomers, for example, from 5 to 75–100 parts of the following: ethyl methacrylate, vinyl acetate, ethyl acrylate, isopropenyl toluene, diallyl phthalate, etc.

*Example 6*

The following copolymers were prepared using the soluble, fusible partial polymers of Example 4.

| Partial Polymer of Example | Parts | Monomer | Parts |
|---|---|---|---|
| 4A | 1 | Styrene | 9 |
| 4C | 1 | Diallyl maleate | 9 |
| 4B | 1 | Styrene | 9 |
| 4D | 1 | Diallyl maleate | 9 |

To each solution there was added 0.1 part benzoyl peroxide and the solution placed in a heating chamber at 60° C. for two (2) hours and then at 75° C. for forty-eight (48) hours until an insoluble, infusible mass was obtained.

The isolated, soluble, fusible copolymers of diallyl maleate and a fumaric or maleic ester may be stored for long periods of time without fear of advancing to a more highly polymerized state. These copolymers are extremely soluble in other unsaturated monomers, and, in fact, are generally more soluble in these monomers than a normal polymer of diallyl maleate. They are soluble in such monomers as styrene, ethyl acrylate, ethyl methacrylate, vinyl acetate, etc., as well as in certain ketones, aromatic solvents such as benzene, toluene, diethyl benzene, etc., aromatic hydrocarbon oil fractions as well as their chlorinated products. Since these copolymers still possess ethylenic unsaturation, they also copolymerize with a variety of unsaturates containing a $CH_2=C<$ group, e. g., styrene, ethyl methacrylate, vinyl acetate, and others. Numerous examples of other monomers suitable for this purpose have been given heretofore.

The soluble, fusible copolymers of this invention may yield, when completely cured, a hard abrasive mass or an infusible body with elastic properties. Under the influence of heat, they can be caused to form an infusible, abrasive-resistant and solvent-resistant state. By virtue of these properties possessed by the isolated, soluble, fusible copolymers and the resulting insoluble, infusible copolymers, a wide field of industrial applications is opened. For example, I may use the soluble, fusible polymers in coating compositions alone or modified with other resins such as polystyrene or an unsaturated alkyd resin. I may prepare castings from these copolymers by, for example, dissolving the resin in some unsaturated monomer having at least one $CH_2=C<$ grouping and copolymerizing the solution under the influence of external heat and a polymerization catalyst.

Where so desired, the soluble, fusible polymerizates of this invention may be used as molding compositions since they are heat convertible. This property permits the molded or formed part, such as the high and low pressure laminates, to be removed from the mold or form while still warm, and in addition, yielding a product having excellent heat-resistant properties. I may mold the solution comprising the soluble, fusible copolymerizate of diallyl maleate and at least one maleic or fumaric ester and another $CH_2=C<$ containing monomer in the presence of benzoyl peroxide under elevated temperatures or pressures thus converting a solution containing a relatively large quantity of thermoplastic material to a heat-hardened, insoluble, infusible piece.

Further examples of such $CH_2=C<$ compounds which can be used in addition to the other two copolymerizate materials are acrolein, methacrolein, allyl methyl ketone, allyl ethyl ketone, allyl chloride, allyl methyl ether, allyl ethyl ether, allyl propyl ether, allyl phenyl ether, allyl acetate, allyl proprionate, allyl benzoate, vinyl ethyl ketone, allyl acrylate, methallyl acrylate, diallyl phthalate, diallyl oxalate, diallyl succinate, divinyl ether, diallyl ether, divinyl ketone, diallyl ketone, dimethallyl ketone, etc.

Modifying the soluble, fusible copolymerizates of this invention with selected copolymerizable components has an effect of imparting whatever properties are desired. The heat-convertible copolymers of this invention may be further modified by including in their compositions fillers such as wood flour, alpha flock, cotton flock, asbestos; opacifiers such as titanium pigments, lime, silica, ground mica, etc.; dyes to impart color, etc. Further modification of these copolymers may be obtained by the introduction of other polymers such as polystyrene, polyvinyl acetate, etc. Coreactive polymers such as the unsaturated alkyl resins may likewise be used to modify the properties of the copolymerized resin.

I may also use the copolymers of this invention with or without further modification as the cohesive ingredients in laminates, the laminae of which may comprise continuous sheet stock of cellulose, rag stock, glass, asbestos, wood, etc., and are particularly suitable as the cohesive ingredients for bonding together sheet stock of cellulose derivatives, such as cellulose acetate, cellulose acetate butyrate, cellulose ethers, for example, ethyl cellulose, benzyl cellulose, etc. When solutions comprising the diallyl maleate copolymerizates are dissolved in hydrocarbons and chlorhydrocarbon oils and further polymerized, a firm gel is formed which may be used as a dielectric medium in capacitors and bushings.

By suitable modifications of copolymers of this invention, I may obtain materials which may be used for wire coverings and for other types of electrical and heat insulation, heat-resistant and protective surface coatings, etc. I may also modify the copolymers of this invention by the use of compounds containing a multiplicity of $CH_2=C<$ groupings, such a diallyl phthalate, divinyl ether, allyl acrylate, glycol dimethacrylate, methallyl methacrylate, etc.

I claim:

1. The process which comprises heating a mixture of monomers consisting of diallyl maleate and a diester in an inert liquid diluent in the presence of a polymerization catalyst for a period less than required to cause gelation thereby producing a soluble, fusible copolymer, said diester being the esterification product of a monohydric alcohol which is free of ethylenic and acetylenic unsaturation and an acid selected from the group consisting of maleic and fumaric acid, and isolating the copolymer so produced, 1 to 20 mols of said ester being used with one mol to 20 mols of diallyl maleate, the concentration of said monomers in said diluent being greater than 40 percent by weight.

2. The process which comprises heating a mixture of monomers consisting of diallyl maleate and a diester in an inert liquid diluent in the presence of a polymerization catalyst for a period less than required to cause gelation thereby producing a soluble, fusible copolymer, said diester being the esterification product of a monohydric alcohol which is free of ethylenic and acetylenic unsaturation and maleic acid and isolating the copolymer so produced, 1 to 20 mols of said ester being used with one mol to 20 mols of diallyl maleate, the concentration of said monomers in said diluent being greater than 40 per cent by weight.

3. The process which comprises heating a mixture of monomers consisting of diallyl maleate and diethyl maleate in an inert liquid diluent in the presence of a polymerization catalyst for a period less than required to cause gelation thereby producing a soluble, fusible copolymer, and isolating the copolymer so produced, 1 to 20 mols of diethyl maleate being used with one mol to 20 mols of diallyl malleate, the concentration of said monomers in said diluent being greater than 40 per cent by weight.

GAETANO F. D'ALELIO.

REFERENCES CITED

The following references are of record in the file of this patent:

UNITED STATES PATENTS

| Number | Name | Date |
|---|---|---|
| 2,332,900 | D'Alelio | Oct. 23, 1943 |
| 2,182,316 | Hopff et al. | Dec. 5, 1939 |
| 2,273,891 | Pollack et al. | Feb. 24, 1942 |

FOREIGN PATENTS

| Number | Country | Date |
|---|---|---|
| 540,168 | Great Britain | Oct. 8, 1941 |